United States Patent
Takashima et al.

(10) Patent No.: US 10,086,669 B2
(45) Date of Patent: Oct. 2, 2018

(54) STABILIZER CONTROL DEVICE

(71) Applicant: TOYOTA JIDOSHA KABUSHIKI KAISHA, Toyota-shi, Aichi-ken (JP)

(72) Inventors: Toru Takashima, Susono (JP); Tetsuya Morino, Susono (JP); Yusuke Suetake, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/482,067

(22) Filed: Apr. 7, 2017

(65) Prior Publication Data
US 2017/0349024 A1  Dec. 7, 2017

(30) Foreign Application Priority Data

Jun. 6, 2016 (JP) ................................. 2016-112866

(51) Int. Cl.
*B60G 17/00* (2006.01)
*B60G 17/016* (2006.01)
*B60G 21/055* (2006.01)

(52) U.S. Cl.
CPC ..... *B60G 17/0162* (2013.01); *B60G 21/0555* (2013.01); *B60G 2400/0511* (2013.01); *B60G 2400/104* (2013.01); *B60G 2400/204* (2013.01); *B60G 2400/41* (2013.01)

(58) Field of Classification Search
None
See application file for complete search history.

(56) References Cited

U.S. PATENT DOCUMENTS

| | | | | |
|---|---|---|---|---|
| 4,796,911 A | * | 1/1989 | Kuroki | B60G 17/0165 280/5.511 |
| 6,425,585 B1 | * | 7/2002 | Schuelke | B60G 17/0162 280/124.106 |
| 6,467,784 B1 | * | 10/2002 | Kim | B60G 21/05 280/124.106 |
| 7,270,336 B2 | * | 9/2007 | Fujimori | B60G 17/025 267/277 |
| 7,530,584 B2 | * | 5/2009 | Drinan | B60G 21/0553 280/124.107 |

(Continued)

FOREIGN PATENT DOCUMENTS

JP  2005-225300 A  8/2005
JP  2006-248489 A  9/2006

*Primary Examiner* — Jonathan M Dager
(74) *Attorney, Agent, or Firm* — Sughrue Mion, PLLC

(57) ABSTRACT

Left and right stabilizer bars are provided between left and right wheels of a vehicle. A control unit controls an actuator to control a rotation angle of the right stabilizer bar with respect to the left stabilizer bar. The control unit determines whether the vehicle is moving, whether a vehicle speed is less than a first threshold value, and whether a vehicle state is in transition from a moving state to a stopped state. A detection unit detects a control amount of the actuator. When the vehicle is moving, the vehicle speed is less than the first threshold value, the vehicle state is in transition from the moving state to the stopped state, and the control amount of the actuator is greater than zero, the control unit decreases the control amount of the actuator such that the control amount of the actuator becomes zero before the vehicle speed becomes zero.

9 Claims, 4 Drawing Sheets

(56) References Cited

U.S. PATENT DOCUMENTS

| | | | | |
|---|---|---|---|---|
| 7,605,555 B2* | 10/2009 | Kurokochi | B60G 21/0556 | 318/139 |
| 7,744,098 B2* | 6/2010 | Sano | B60G 17/0162 | 280/5.511 |
| 7,766,344 B2* | 8/2010 | Buma | B60G 3/202 | 280/124.106 |
| 7,931,281 B2* | 4/2011 | Maeda | B60G 11/183 | 267/183 |
| 8,027,765 B2* | 9/2011 | Urababa | B60G 17/0162 | 280/124.1 |
| 8,521,362 B2* | 8/2013 | Miyajima | B60G 17/0162 | 180/282 |
| 8,616,567 B2* | 12/2013 | Eguchi | B60G 3/20 | 267/189 |
| 8,616,569 B2* | 12/2013 | Ohletz | B60G 11/183 | 267/188 |
| 9,283,824 B2* | 3/2016 | Koch | B60G 17/0162 | |
| 9,321,323 B2* | 4/2016 | Schindler | B60G 17/025 | |
| 9,333,830 B2* | 5/2016 | Illg | B60G 17/0162 | |
| 2002/0180167 A1* | 12/2002 | Schmidt | B60G 21/0553 | 280/5.511 |
| 2004/0176890 A1* | 9/2004 | Acker | B60G 17/0162 | 701/38 |
| 2005/0077696 A1* | 4/2005 | Ogawa | B60G 17/0162 | 280/124.157 |
| 2005/0079066 A1* | 4/2005 | Tatsuya | B60G 17/0162 | 417/313 |
| 2005/0179220 A1* | 8/2005 | Yasui | B60G 17/0162 | 280/5.506 |
| 2005/0179221 A1* | 8/2005 | Yasui | B60G 17/0162 | 280/5.506 |
| 2005/0211518 A1* | 9/2005 | Kraus | B60G 21/0555 | 188/321.11 |
| 2005/0264247 A1* | 12/2005 | Buma | B60G 17/0157 | 318/432 |
| 2005/0275172 A1* | 12/2005 | Song | B60G 17/0162 | 280/5.511 |
| 2006/0049601 A1* | 3/2006 | Matsumoto | B60G 17/0162 | 280/124.106 |
| 2006/0113740 A1* | 6/2006 | Green | B60G 21/0555 | 280/124.107 |
| 2006/0116802 A1* | 6/2006 | Yamada | B60G 17/0182 | 701/37 |
| 2006/0138732 A1* | 6/2006 | Buma | B60G 17/0162 | 280/5.5 |
| 2007/0119644 A1* | 5/2007 | Yasui | B60G 17/0162 | 180/183 |
| 2007/0182110 A1* | 8/2007 | Urababa | B60G 17/0162 | 280/5.508 |
| 2007/0194733 A1* | 8/2007 | Kurokochi | B60G 21/0556 | 318/376 |
| 2009/0008887 A1* | 1/2009 | Buma | B60G 17/0162 | 280/5.511 |
| 2009/0091093 A1* | 4/2009 | Urababa | B60G 17/0162 | 280/5.511 |
| 2010/0164189 A1* | 7/2010 | Buma | B60G 17/0161 | 280/5.521 |
| 2010/0276896 A1* | 11/2010 | Sano | B60G 17/0152 | 280/5.509 |
| 2010/0324780 A1* | 12/2010 | Koumura | B60G 17/0165 | 701/38 |
| 2013/0307241 A1* | 11/2013 | Brown | B60G 21/106 | 280/124.107 |

* cited by examiner

STABILIZER CONTROL DEVICE

BACKGROUND

Technical Field

The present invention relates to a stabilizer control device having an actuator provided between a left stabilizer bar and a right stabilizer bar.

Background Art

A stabilizer control device having an actuator provided between a left stabilizer bar and a right stabilizer bar is conventionally known. An example of such the stabilizer control device is described, for example, in Patent Literature 1.

According to the stabilizer control device described in Patent Literature 1, the left stabilizer bar, the right stabilizer bar, and the actuator are arranged between a left wheel and a right wheel of a vehicle. More specifically, the left stabilizer bar is connected to a stator of a motor of the actuator. Moreover, the right stabilizer bar is connected to a rotor of the motor of the actuator through a reducer of the actuator.

Therefore, according to the stabilizer control device described in Patent Literature 1, when electric power is supplied to the motor, the rotor of the motor rotates with respect to the stator, and thereby the right stabilizer bar rotates with respect to the left stabilizer bar.

LIST OF RELATED ART

Patent Literature 1: JP-2005-225300 A

SUMMARY

The above-mentioned Patent Literature 1 describes that a motor driving current is decreased from a value other than zero to zero, that is, a control amount of the actuator is decreased from a value other than zero to zero. Specifically, according to the stabilizer control device described in Patent Literature 1, the control amount of the actuator is decreased when a vehicle turning degree is decreasing, in order to improve convergence of a vehicle body roll motion.

If the control amount of the actuator is decreased from a value other than zero to zero when the vehicle is at a stop, which is not described in Patent Literature 1, then a rotation angle of the right stabilizer bar with respect to the left stabilizer bar decreases, and thus a behavior of the stabilizer control device may give a passenger a feeling of strangeness.

Moreover, let us consider a case where a vehicle to which the stabilizer control device is applied is provided with a suspension apparatus and the control amount of the actuator is decreased from a value other than zero to zero when the vehicle is at a stop. In this case, even when the rotation angle of the right stabilizer bar with respect to the left stabilizer bar decreases, the vehicle body being a sprung mass member may not return to a proper position due to friction of the suspension apparatus.

Moreover, let us consider a case where the stabilizer control device is applied to a vehicle and the control amount of the actuator is decreased from a value other than zero to zero when the vehicle is at a stop. In this case, even when the rotation angle of the right stabilizer bar with respect to the left stabilizer bar decreases, the vehicle body may not return to a proper position because distortion of the vehicle body remains.

If the vehicle body does not return to a proper position, the vehicle being at a stop remains in a state where the vehicle body does not return to the proper position, that is, an improper inclined state.

In consideration of the problem described above, an object of the present invention is to provide a stabilizer control device that can suppress the possibility that the passenger has a feeling of strangeness and a vehicle attitude remains in an improper state when the vehicle is at a stop.

In an aspect of the present invention, a stabilizer control device includes:

a left stabilizer bar and a right stabilizer bar provided between a left wheel and a right wheel of a vehicle;

an actuator provided between the left stabilizer bar and the right stabilizer bar;

a control unit configured to control the actuator to control a rotation angle of the right stabilizer bar with respect to the left stabilizer bar;

a moving determination unit configured to determine whether or not the vehicle is moving;

a vehicle speed determination unit configured to determine whether or not a speed of the vehicle is less than a first threshold value;

a vehicle state transition determination unit configured to determine whether or not a state of the vehicle is in transition from a moving state to a stopped state; and a detection unit configured to detect a control amount of the actuator.

When the vehicle is moving, the speed of the vehicle is less than the first threshold value, the state of the vehicle is in transition from the moving state to the stopped state, and the control amount of the actuator is greater than zero, the control unit decreases the control amount of the actuator such that the control amount of the actuator becomes zero before the speed of the vehicle becomes zero.

That is, according to the stabilizer control device of the present invention, the rotation angle of the right stabilizer bar with respect to the left stabilizer bar is decreased not by decreasing the control amount of the actuator to zero when the vehicle is at a stop but by decreasing the control amount of the actuator to zero when the vehicle is moving.

Therefore, according to the stabilizer control device of the present invention, the possibility that a behavior of the stabilizer control device gives a passenger a feeling of strangeness when the vehicle is at a stop can be more suppressed, as compared with the case where the control amount of the actuator is decreased to zero when the vehicle is at a stop.

Moreover, according to the stabilizer control device of the present invention, after the control amount of the actuator is decreased to zero and the rotation angle of the right stabilizer bar with respect to the left stabilizer bar is decreased, a vehicle behavior until the vehicle completely stops is used for returning the vehicle body to a proper position.

Therefore, according to the stabilizer control device of the present invention, the possibility that the vehicle body is not at a proper position when the vehicle is at a stop can be more suppressed, as compared with the case where the control amount of the actuator is decreased to zero when the vehicle is at a stop.

That is, according to the stabilizer control device of the present invention, the possibility that the passenger has a feeling of strangeness and a vehicle attitude remains in an improper state when the vehicle is at a stop can be more suppressed, as compared with the case where the control amount of the actuator is decreased to zero when the vehicle is at a stop.

In another aspect of the present invention, the stabilizer control device may further include a deceleration determination unit configured to determine whether or not the vehicle is decelerating.

In this case, when the vehicle is decelerating, the vehicle state transition determination unit may determine that the state of the vehicle is in transition from the moving state to the stopped state. The control unit may decrease the control amount of the actuator such that the control amount of the actuator becomes zero when the vehicle is decelerating.

According to the stabilizer control device of the present invention, when the vehicle is decelerating, the control amount of the actuator is decreased to zero, and thereby the rotation angle of the right stabilizer bar with respect to the left stabilizer bar is decreased.

Therefore, according to the stabilizer control device of the present invention, it is possible to return the vehicle body to a proper position by using a vehicle behavior during deceleration after the control amount of the actuator is decreased to zero.

That is, according to the stabilizer control device of the present invention, it is possible to more certainly return the vehicle body to a proper position, as compared with a case where a vehicle behavior during deceleration does not occur after the control amount of the actuator is decreased to zero.

In still another aspect of the present invention, a decrease gradient of the control amount of the actuator may become higher as a deceleration of the vehicle becomes higher.

The higher the deceleration of the vehicle becomes, the earlier the vehicle speed becomes zero.

In consideration of the above, according to the stabilizer control device of the present invention, the decrease gradient of the control amount of the actuator becomes higher as the deceleration of the vehicle becomes higher.

Therefore, according to the stabilizer control device of the present invention, it is possible to suppress a possibility that a time required for the vehicle body to return to a proper position after the control amount of the actuator becomes zero cannot be secured, as compared with a case where the deceleration of the vehicle is high but the decrease gradient of the control amount of the actuator is low.

In still another aspect of the present invention, the stabilizer control device may further include a pitch behavior determination unit configured to determine whether or not a pitch behavior of the vehicle is occurring.

In this case, when the pitch behavior is occurring, the vehicle state transition determination unit may determine that the state of the vehicle is in transition from the moving state to the stopped state. The control unit may decrease the control amount of the actuator such that the control amount of the actuator becomes zero when the pitch behavior is occurring.

That is, according to the stabilizer control device of the present invention, when the pitch behavior of the vehicle is occurring, the control amount of the actuator is decreased to zero, and thereby the rotation angle of the right stabilizer bar with respect to the left stabilizer bar is decreased.

Therefore, according to the stabilizer control device of the present invention, it is possible to return the vehicle body to a proper position by using the pitch behavior of the vehicle after the control amount of the actuator is decreased to zero.

That is, according to the stabilizer control device of the present invention, it is possible to more certainly return the vehicle body to a proper position, as compared with a case where the pitch behavior of the vehicle does not occur after the control amount of the actuator is decreased to zero.

In still another aspect of the present invention, the first threshold value may be set such that the control amount of the actuator becomes zero when the pitch behavior is occurring.

That is, according to the stabilizer control device of the present invention, by setting the first threshold value to a large value, it is possible to expedite a timing of starting the control for decreasing the control amount of the actuator and thus to expedite a timing when the control amount of the actuator becomes zero. As a result, it is possible to secure the time required for the vehicle body to return to a proper position after the control amount of the actuator becomes zero.

In still another aspect of the present invention, a decrease gradient of the control amount of the actuator may be set such that the control amount of the actuator becomes zero when the pitch behavior is occurring.

That is, according to the stabilizer control device of the present invention, by setting the decrease gradient of the control amount of the actuator to a high value, it is possible to reduce a time required for the control amount of the actuator to become zero and thus to expedite a timing when the control amount of the actuator becomes zero. As a result, it is possible to secure the time required for the vehicle body to return to a proper position after the control amount of the actuator becomes zero.

In still another aspect of the present invention, the stabilizer control device may further include:

a stroke sensor configured to detect a stroke amount which is an amount of a vertical displacement of a vehicle body of the vehicle; and a stroke amount determination unit configured to determine whether or not the stroke amount detected by the stroke sensor is greater than a second threshold value.

In this case, when the stroke amount is greater than the second threshold value, the vehicle state transition determination unit may determine that the state of the vehicle is in transition from the moving state to the stopped state. The control unit may decrease the control amount of the actuator such that the control amount of the actuator becomes zero when the stroke amount is greater than the second threshold value.

The stroke amount, which is the amount of the vertical displacement of the vehicle body, being large means that a displacement of the vehicle body with respect to the proper position is large. On the other hand, the stroke amount being small means that a displacement of the vehicle body with respect to the proper position is small. When the displacement of the vehicle body with respect to the proper position is large, it is highly necessary to execute, when the vehicle is moving, the control for decreasing the control amount of the actuator to zero.

In consideration of the above, according to the stabilizer control device of the present invention, the control amount of the actuator is decreased to zero when the stroke amount being the amount of the vertical displacement of the vehicle body is greater than the second threshold value. That is, when the stroke amount being the amount of the vertical displacement of the vehicle body becomes greater than the second threshold value, the control for decreasing the control amount of the actuator to zero is started.

Therefore, according to the stabilizer control device of the present invention, the possibility that the vehicle body is not at the proper position when the vehicle is at a stop can be more suppressed, as compared with a case where the control for decreasing the control amount of the actuator to zero is not started when the displacement of the vehicle body with respect to the proper position is large.

Moreover, according to the stabilizer control device of the present invention, in a period during which the control amount of the actuator is decreased to zero or after the control amount of the actuator is decreased to zero, it is possible to return the vehicle body to the proper position by using a vehicle behavior associated with the decrease in the stroke amount being the amount of the vertical displacement of the vehicle body from the second threshold value to zero.

That is, according to the stabilizer control device of the present invention, it is possible to more certainly return the vehicle body to the proper position, as compared with a case where the vehicle behavior, which is associated with the decrease in the stroke amount being the amount of the vertical displacement of the vehicle body from the second threshold value to zero, does not occur after the control for decreasing the control amount of the actuator to zero is started.

In still another aspect of the present invention, the stabilizer control device may further include:

a stroke sensor configured to detect a stroke amount which is an amount of a vertical displacement of a vehicle body of the vehicle; and a stroke amount change rate determination unit configured to determine whether or not a change rate of the stroke amount detected by the stroke sensor is greater than a third threshold value.

In this case, when the change rate of the stroke amount is greater than the third threshold value, the vehicle state transition determination unit may determine that the state of the vehicle is in transition from the moving state to the stopped state. The control unit may decrease the control amount of the actuator such that the control amount of the actuator becomes zero when the change rate of the stroke amount is greater than the third threshold value.

The change rate of the stroke amount which is the amount of the vertical displacement of the vehicle body being high means that a vehicle behavior is rapid.

In consideration of the above, according to the stabilizer control device of the present invention, the control amount of the actuator is decreased to zero when the vehicle behavior is rapid. That is, the control for decreasing the control amount of the actuator to zero is started when the vehicle behavior is rapid.

Therefore, according to the stabilizer control device of the present invention, it is possible to return the vehicle body to the proper position by using the rapid vehicle behavior in a period during which the control amount of the actuator is decreased to zero or the rapid vehicle behavior after the control amount of the actuator is decreased to zero.

That is, according to the stabilizer control device of the present invention, it is possible to more certainly return the vehicle body to the proper position, as compared with a case where the rapid vehicle behavior does not occur after the control for decreasing the control amount of the actuator to zero is started.

In still another aspect of the present invention, the control unit may decrease the control amount of the actuator such that the control amount of the actuator overshoots zero and then becomes zero before the speed of the vehicle becomes zero.

For example, let us consider a case where the stabilizer control device is applied to the vehicle having a suspension apparatus and friction of the suspension apparatus is large. In this case, just decreasing the control amount of the actuator to zero without overshooting zero when the vehicle is moving may not enough for the vehicle body to return to the proper position.

In consideration of the above, according to the stabilizer control device of the present invention, the control amount of the actuator once overshoots zero and then is decreased to zero before the speed of the vehicle becomes zero.

Therefore, according to the stabilizer control device of the present invention, the possibility that the vehicle body does not return to the proper position can be more suppressed, as compared with a case where the control amount of the actuator is decreased to zero without overshooting zero.

According to the present invention, it is possible to suppress the possibility that the passenger has a feeling of strangeness and the vehicle attitude remains in an improper state when the vehicle is at a stop.

EMBODIMENTS

First Embodiment

Figure 1:
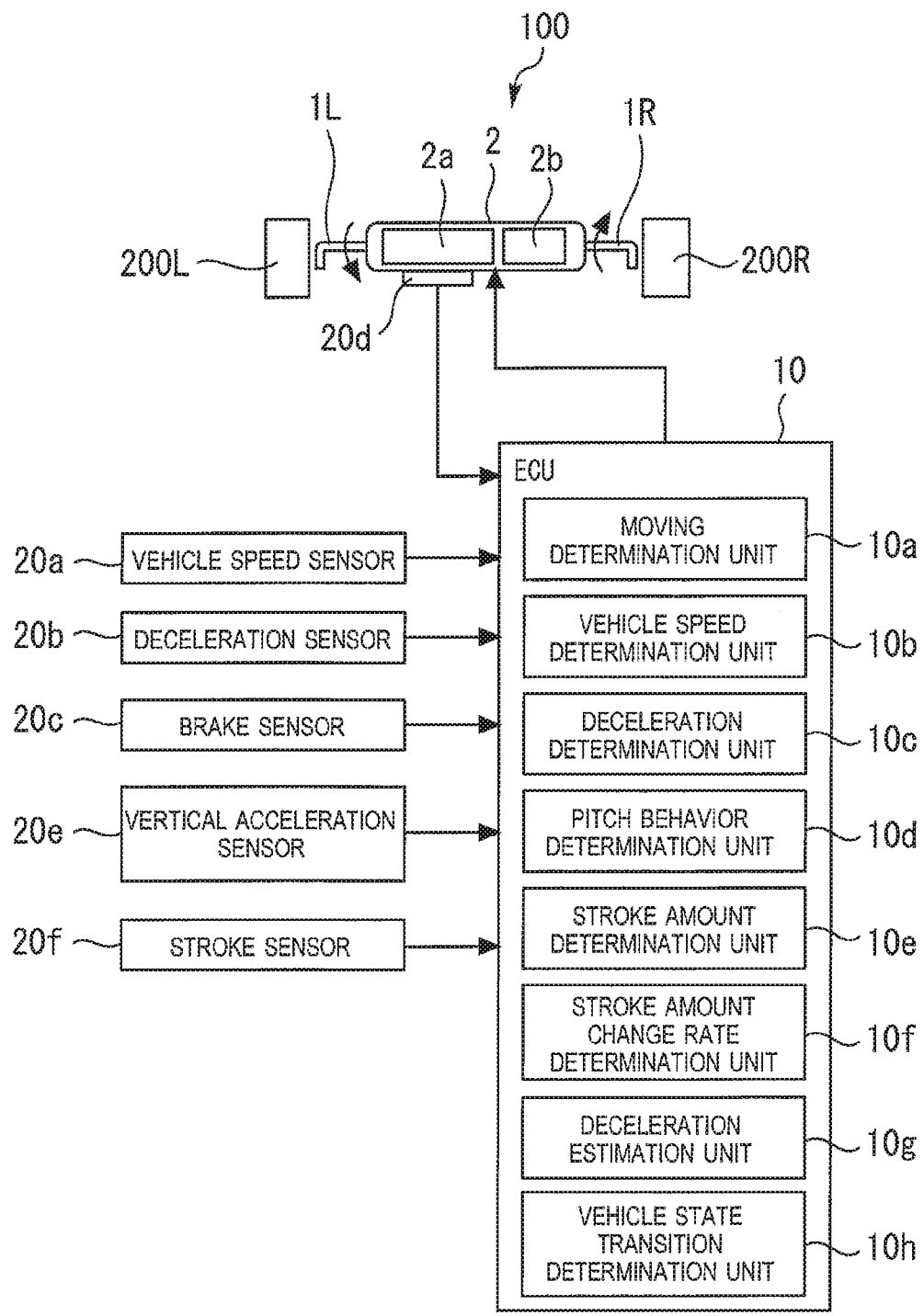
FIG. 1 is a schematic diagram showing a configuration of a stabilizer control device 100 according to a first embodiment.

A first embodiment of a stabilizer control device according to the present invention will be described hereinafter. FIG. 1 is a schematic diagram showing a configuration of the stabilizer control device 100 according to the first embodiment.

The stabilizer control device 100 according to the first embodiment can be applied to any of a front wheel side and a rear wheel side of a vehicle.

In the example shown in FIG. 1 to which the stabilizer control device 100 according to the first embodiment is applied, the stabilizer control device 100 includes a left stabilizer bar 1L, a right stabilizer bar 1R, an actuator 2, and an ECU (Electronic Control Unit) 10 serving as a control unit. The left stabilizer bar 1L and the right stabilizer bar 1R are provided between a left wheel 200L and a right wheel 200R of a vehicle (not shown). The actuator 2 is provided between the left stabilizer bar 1L and the right stabilizer bar 1R, and includes a motor 2a and a reducer 2b.

In the example shown in FIG. 1 to which the stabilizer control device 100 according to the first embodiment is applied, the left stabilizer bar 1L is connected to a stator (not shown) of the motor 2a of the actuator 2. The right stabilizer bar 1R is connected to a rotor (not shown) of the motor 2a of the actuator 2 through the reducer 2b of the actuator 2.

In another example to which the stabilizer control device 100 according to the first embodiment is applied, the right stabilizer bar 1R is connected to the stator of the motor 2a of the actuator 2, and the left stabilizer bar 1L is connected to the rotor of the motor 2a of the actuator 2 through the reducer 2b of the actuator 2.

In the example shown in FIG. 1 to which the stabilizer control device 100 according to the first embodiment is applied, the actuator 2 including the motor 2a and the reducer 2b is used. In another example to which the stabilizer control device 100 according to the first embodiment is applied, a hydraulic actuator as described in Patent Literature JP-2007-269146 A for example or a publicly known pneumatic actuator is used.

In the example shown in FIG. 1 to which the stabilizer control device 100 according to the first embodiment is applied, the ECU 10 controls the motor 2a (specifically, controls at least one of a current, a voltage, and a power supplied to the motor 2a) to control a rotation angle of the right stabilizer bar 1R with respect to the left stabilizer bar 1L. When electric power is supplied to the motor 2a, the rotor of the motor 2a rotates with respect to the stator, and thereby the right stabilizer bar 1R rotates with respect to the left stabilizer bar 1L.

In the example shown in FIG. 1 to which the stabilizer control device 100 according to the first embodiment is applied, a rotation angle of the rotor with respect to the stator in the motor 2a is detected by a resolver sensor 20d. The rotation angle of the right stabilizer bar 1R with respect to the left stabilizer bar 1L is calculated, by the ECU 10 for example, based on an output signal of the resolver sensor 20d, a reduction ratio of the reducer 2b, and so forth.

That is, in the example shown in FIG. 1 to which the stabilizer control device 100 according to the first embodiment is applied, the resolver sensor 20d serves as a detection unit that detects a control amount of the actuator 2. The control amount is exemplified by values of the current, voltage, and power supplied to the motor 2a, the rotation angle of the rotor with respect to the stator in the motor 2a, and the like.

In the example to which the stabilizer control device 100 according to the first embodiment is applied and where the hydraulic actuator or the pneumatic actuator is used as described above, the control amount of the actuator can be detected, for example, by detecting a position of a piston of the actuator or by detecting the rotation angle of the right stabilizer bar 1R with respect to the left stabilizer bar 1L.

In the example shown in FIG. 1 to which the stabilizer control device 100 according to the first embodiment is applied, a vehicle speed sensor 20a detects a speed (vehicle speed) of the vehicle to which the stabilizer control device 100 is applied. A moving determination unit 10a of the ECU 10 determines, based on an output signal of the vehicle speed sensor 20a, whether or not the vehicle is moving. A vehicle speed determination unit 10b of the ECU 10 determines, based on the output signal of the vehicle speed sensor 20a, whether or not the vehicle speed is less than a first threshold value VT to be described later. A deceleration determination unit 10c of the ECU 10 determines, based on the output signal of the vehicle speed sensor 20a, whether or not the vehicle is decelerating.

In the example shown in FIG. 1 to which the stabilizer control device 100 according to the first embodiment is applied, a deceleration sensor 20b detects a deceleration of the vehicle. More specifically, the deceleration sensor 20b detects an acceleration in a longitudinal direction of the vehicle. The deceleration determination unit 10c of the ECU 10 may determine, based on an output signal of the deceleration sensor 20b, whether or not the vehicle is decelerating.

In the example shown in FIG. 1 to which the stabilizer control device 100 according to the first embodiment is applied, a brake sensor 20c detects an amount of a brake operation performed by a driver of the vehicle. More specifically, the brake sensor 20c detects the amount of the driver's brake operation based on a stroke amount (or an angle or a pressure) of a brake pedal (not shown). The deceleration determination unit 10c of the ECU 10 may determine, based on an output signal of the brake sensor 20c, whether or not the vehicle is decelerating.

In another example to which the stabilizer control device 100 according to the first embodiment is applied, the deceleration sensor 20b and the brake sensor 20c are omitted.

In the example shown in FIG. 1 to which the stabilizer control device 100 according to the first embodiment is applied, a vertical acceleration of a vehicle body of the vehicle is detected by a vertical acceleration sensor 20e. The vertical acceleration sensor 20e detects the acceleration in the vertical direction of the vehicle body. A pitch behavior determination unit 10d of the ECU 10 determines, based on an output signal of the vertical acceleration sensor 20e, whether or not a pitch behavior of the vehicle is occurring.

In another example to which the stabilizer control device 100 according to the first embodiment is applied, the vertical acceleration sensor 20e and the pitch behavior determination unit 10d are omitted.

In the example shown in FIG. 11 to which the stabilizer control device 100 according to the first embodiment is applied, a stroke sensor 20f detects a stroke amount which is an amount of a vertical displacement of the vehicle body of the vehicle. A stroke amount determination unit 10e of the ECU 10 determines, based on an output signal of the stroke sensor 20f, whether or not the stroke amount is greater than a second threshold value to be described later. A stroke amount change rate determination unit 10f of the ECU 10 calculates, based on the output signal of the stroke sensor 20f, a change rate of the stroke amount and determines whether or not the change rate of the stroke amount is greater than a third threshold value to be described later.

In another example to which the stabilizer control device 100 according to the first embodiment is applied, the stroke sensor 20f, the stroke amount determination unit 10e, and the stroke amount change rate determination unit 10f are omitted.

In the example shown in FIG. 1 to which the stabilizer control device 100 according to the first embodiment is applied, the deceleration sensor 20b can detect the deceleration of the vehicle, as described above.

Also, in the example shown in FIG. 1 to which the stabilizer control device 100 according to the first embodiment is applied, a deceleration estimation unit 10g of the ECU 10 can calculate (estimate) the deceleration of the vehicle, based on the output signal of the vehicle speed sensor 20a or the output signal of the brake sensor 20c.

In another example to which the stabilizer control device 100 according to the first embodiment is applied, the deceleration estimation unit 10g is omitted.

In the example shown in FIG. 1 to which the stabilizer control device 100 according to the first embodiment is applied, when the deceleration determination unit 10c determines that the vehicle is decelerating, a vehicle state transition determination unit 10h determines that a vehicle state is in transition from a moving state to a stopped state. On the other hand, when the deceleration determination unit 10c determines that the vehicle is not decelerating, the vehicle state transition determination unit 10*h* determines that the vehicle state is not in transition from the moving state to the stopped state.

Figure 2:
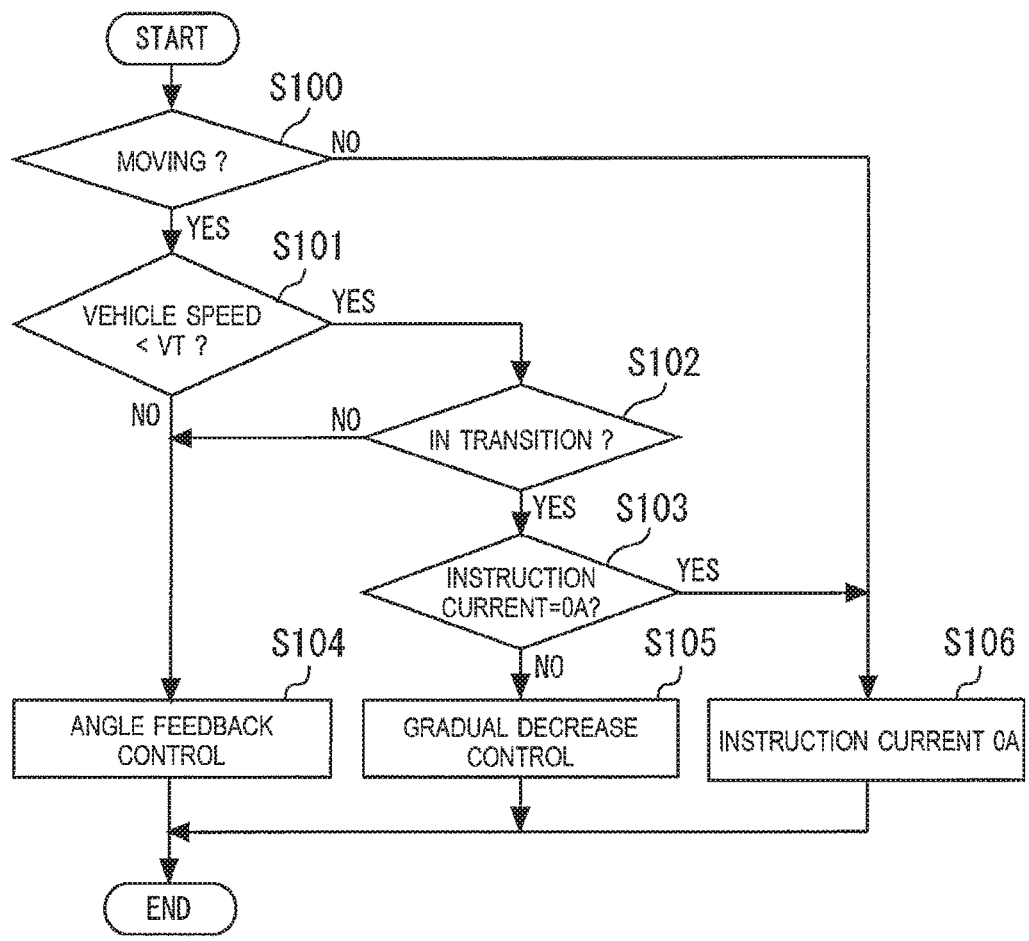
FIG. 2 is a flow chart for explaining a control executed in the stabilizer control device 100 according to the first embodiment.

FIG. 2 is a flow chart for explaining a control executed in the stabilizer control device 100 (see FIG. 1) according to the first embodiment.

After a routine shown in FIG. 2 is started, the moving determination unit 10*a* (see FIG. 1) first determines, at Step S100, whether or not the vehicle to which the stabilizer control device 100 is applied is moving. If the determination results in "YES", then the process proceeds to Step S101. If the determination results in "NO", the process proceeds to Step S106.

At Step S101, the vehicle speed determination unit 10*b* (see FIG. 1) determines whether or not the speed (vehicle speed) of the vehicle is less than the first threshold value VT. If the determination results in "YES", then the process proceeds to Step S102. If the determination results in "NO", the process proceeds to Step S104.

At Step S102, the vehicle state transition determination unit 10*h* (see FIG. 1) determines whether or not the vehicle state is in transition from the moving state to the stopped state. If the determination results in "YES", then the process proceeds to Step S103. If the determination results in "NO", the process proceeds to Step S104.

At Step S103, the ECU 10 (see FIG. 1), for example, determines whether or not the control amount of the actuator 2 (see FIG. 1) is zero. If the determination results in "YES", then the process proceeds to Step S106. If the determination results in "NO", the process proceeds to Step S105.

In the example shown in FIG. 2 to which the stabilizer control device 100 according to the first embodiment is applied, when a current instruction value supplied from the ECU 10 to the motor 2*a* (see FIG. 1) is zero [A], it is determined at Step S103 that the control amount of the actuator 2 is zero.

In another example to which the stabilizer control device 100 according to the first embodiment is applied, when a voltage instruction value supplied from the ECU 10 to the motor 2*a* is zero [V], it is determined at Step S103 that the control amount of the actuator 2 is zero.

In still another example to which the stabilizer control device 100 according to the first embodiment is applied, when a power instruction value supplied from the ECU 10 to the motor 2*a* is zero [W], it is determined at Step S103 that the control amount of the actuator 2 is zero.

In still another example to which the stabilizer control device 100 according to the first embodiment is applied, when the rotation angle of the rotor with respect to the stator of the motor 2*a* detected by the resolver sensor 20*d* (see FIG. 1) is zero [deg], namely, when the rotation angle of the right stabilizer bar 1R (see FIG. 1) with respect to the left stabilizer bar 1L (see FIG. 1) is zero [deg], it is determined at Step S103 that the control amount of the actuator 2 is zero.

In the example to which the stabilizer control device 100 according to the first embodiment is applied and where the hydraulic actuator or the pneumatic actuator is used as described above, when the rotation angle of the right stabilizer bar 1R with respect to the left stabilizer bar 1L is zero [deg], it is determined at Step S103 that the control amount of the hydraulic or pneumatic actuator is zero.

At Step S104, the ECU 10 (see FIG. 1) executes an angle feedback control of the motor 2*a* of the actuator 2 (see FIG. 1).

For example, at Step S104, a target lateral acceleration is determined based on the vehicle speed, a steering angle and so forth. Moreover, a target rotation angle of the rotor with respect to the stator of the motor 2*a* (corresponding to a target rotation angle of the right stabilizer bar 1R with respect to the left stabilizer bar 1L) which is required for suppressing roll of the vehicle body is determined based on the target lateral acceleration. Then, the angle feedback control is executed based on a difference between the target rotation angle and an actual rotation angle of the rotor with respect to the stator of the motor 2*a*.

At Step S105, the ECU 10 (see FIG. 1) executes a "gradual decrease control" that decreases the control amount of the actuator 2 (see FIG. 1) such that the control amount of the actuator 2 becomes zero before the vehicle speed becomes zero.

More specifically, in the example shown in FIG. 2 to which the stabilizer control device 100 (see FIG. 1) according to the first embodiment is applied, at Step S105, the current value supplied to the motor 2*a* is decreased such that the current value supplied to the motor 2*a* becomes zero [A] before the vehicle speed becomes zero.

That is, in the example shown in FIG. 2 to which the stabilizer control device 100 (see FIG. 1) according to the first embodiment is applied, at Step S105, the current value supplied to the motor 2*a* is decreased such that the rotation angle of the rotor with respect to the stator of the motor 2*a* becomes zero [deg] and thus the rotation angle of the right stabilizer bar 1R with respect to the left stabilizer bar 1L becomes zero [deg] before the vehicle speed becomes zero.

In another example to which the stabilizer control device 100 according to the first embodiment is applied, at Step S105, the voltage value supplied to the motor 2*a* is decreased such that the voltage value supplied to the motor 2*a* becomes zero [V] before the vehicle speed becomes zero. When the voltage value supplied to the motor 2*a* becomes zero [V], the rotation angle of the rotor with respect to the stator of the motor 2*a* becomes zero [deg] and thus the rotation angle of the right stabilizer bar 1R with respect to the left stabilizer bar 1L becomes zero [deg].

In still another example to which the stabilizer control device 100 according to the first embodiment is applied, at Step S105, the power value supplied to the motor 2*a* is decreased such that the power value supplied to the motor 2*a* becomes zero [W] before the vehicle speed becomes zero. When the power value supplied to the motor 2*a* becomes zero [W], the rotation angle of the rotor with respect to the stator of the motor 2*a* becomes zero [deg] and thus the rotation angle of the right stabilizer bar 1R with respect to the left stabilizer bar 1L becomes zero [deg].

In the example to which the stabilizer control device 100 according to the first embodiment is applied and where the hydraulic actuator or the pneumatic actuator is used as described above, at Step S105, the control amount of the hydraulic or pneumatic actuator is decreased such that the rotation angle of the right stabilizer bar 1R with respect to the left stabilizer bar 1L becomes zero [deg] (i.e. the control amount of the hydraulic or pneumatic actuator becomes zero) before the vehicle speed becomes zero.

At Step S106, the ECU 10 (see FIG. 1) sets the control amount of the actuator 2 (see FIG. 1) to zero.

More specifically, in the example shown in FIG. 2 to which the stabilizer control device 100 (see FIG. 1) according to the first embodiment is applied, at Step S106, the current instruction value supplied from the ECU 10 to the motor 2*a* is set to zero [A]. As described above, when the current value supplied to the motor 2*a* becomes zero [A], the rotation angle of the rotor with respect to the stator of the motor 2a becomes zero [deg] and thus the rotation angle of the right stabilizer bar 1R with respect to the left stabilizer bar 1L becomes zero [deg].

In another example to which the stabilizer control device 100 according to the first embodiment is applied, at Step S106, the voltage instruction value supplied from the ECU 10 to the motor 2a is set to zero [V].

In still another example to which the stabilizer control device 100 according to the first embodiment is applied, at Step S106, the power instruction value supplied from the ECU 10 to the motor 2a is set to zero [W].

In the example to which the stabilizer control device 100 according to the first embodiment is applied and where the hydraulic actuator or the pneumatic actuator is used as described above, at Step S106, the instruction value of the control amount supplied from the ECU 10 to the hydraulic or pneumatic actuator is set to zero.

Figure 3:
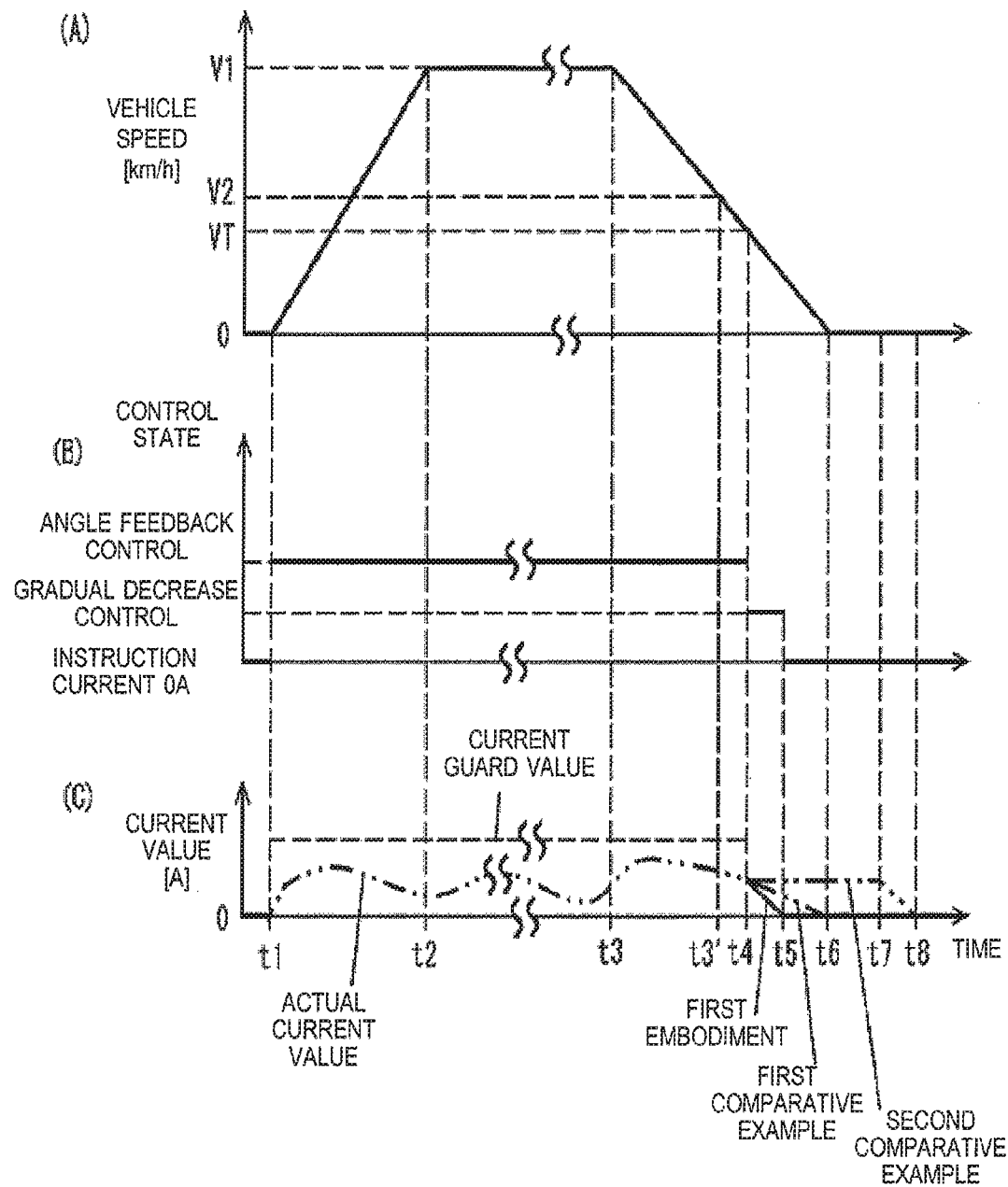
FIG. 3 is a timing chart for explaining a control executed in the stabilizer control device 100 according to the first embodiment.

FIG. 3 is a timing chart for explaining the control executed in the stabilizer control device 100 (see FIG. 1) according to the first embodiment. More specifically, a row (A) in FIG. 3 indicates the vehicle speed [km/h] of the vehicle to which the stabilizer control device 100 is applied. A row (B) in FIG. 3 indicates the state of the control being executed by the stabilizer control device 100. A row (C) in FIG. 3 indicates the current value [A] supplied from the ECU 10 to the motor 2a.

In the example shown in FIG. 3 to which the stabilizer control device 100 according to the first embodiment is applied, before a time t1, the vehicle speed is zero [km/h] as shown in the row (A). Therefore, the determination at Step S100 (see FIG. 2) results in "NO", and Step S106 (see FIG. 2) is executed. Thus, as shown in the row (B), the state of the control executed by the stabilizer control device 100 is the "instruction current 0 A". As a result, as shown in the row (C), the current value supplied from the ECU 10 to the motor 2a becomes zero [A].

Next, in the example shown in FIG. 3 to which the stabilizer control device 100 according to the first embodiment is applied, as shown in the row (A), the vehicle speed starts to increase from zero [km/h] at the time t1. At a time t2, the vehicle speed reaches a value V1 (>VT) [km/h]. Therefore, in a period from t1 to t2, the determination at Step S100 (see FIG. 2) results in "YES". Then, the determination at Step S101 (see FIG. 2) results in "NO" or the determination at Step S102 (see FIG. 2) results in "NO", and thus Step S104 (see FIG. 2) is executed. As a result, as shown in the row (B), the state of the control executed by the stabilizer control device 100 is the "angle feedback control". Since the angle feedback control is executed, the current value (i.e. an "actual current value" shown in the row (C)) supplied from the ECU 10 (see FIG. 1) to the motor 2a varies depending on changes in the vehicle speed, steering angle and the like, as show in the row (C). During execution of the angle feedback control, the current value supplied from the ECU 10 to the motor 2a is guarded so as not to excess a "current guard value" shown in the row (C).

Next, in the example shown in FIG. 3 to which the stabilizer control device 100 according to the first embodiment is applied, as shown in the row (A), the vehicle speed is kept at the constant value V1 (>VT) [km/h] in a period from t2 to t3. Therefore, the determination at Step S100 results in "YES", the determination at Step S101 results in "NO", and thus Step S104 is executed. As a result, as shown in the row (B), the state of the control executed by the stabilizer control device 100 is the "angle feedback control". Since the angle feedback control is executed, the current value (i.e. the "actual current value" shown in the row (C)) supplied from the ECU 10 to the motor 2a varies depending on changes in the vehicle speed, steering angle and the like, as show in the row (C).

Next, in the example shown in FIG. 3 to which the stabilizer control device 100 according to the first embodiment is applied, as shown in the row (A), the vehicle speed starts to decrease from V1 [km/h] at the time t3. At a time t4, the vehicle speed reaches the first threshold value VT [km/h]. Therefore, in a period from t3 to t4, the determination at Step S100 (see FIG. 2) results in "YES", the determination at Step S101 (see FIG. 2) results in "NO", and thus Step S104 (see FIG. 2) is executed. As a result, as shown in the row (B), the state of the control executed by the stabilizer control device 100 is the "angle feedback control". Since the angle feedback control is executed, the current value (i.e. the "actual current value" shown in the row (C)) supplied from the ECU 10 (see FIG. 1) to the motor 2a varies depending on changes in the vehicle speed, steering angle and the like, as show in the row (C).

Next, in the example shown in FIG. 3 to which the stabilizer control device 100 according to the first embodiment is applied, as shown in the row (A), the vehicle speed is less than the first threshold value VT after the time t4. At a time t6, the vehicle speed reaches zero [km/h].

More specifically, in the example shown in FIG. 3 to which the stabilizer control device 100 according to the first embodiment is applied, in a period from t4 to t5, the determination at Step S100 results in "YES", the determination at Step S101 results in "YES", the determination at Step S102 (see FIG. 2) results in "YES", the determination at Step S103 (see FIG. 2) results in "NO", and thus Step S105 is executed. As a result, as shown in the row (B), the state of the control executed by the stabilizer control device 100 is the "gradual decrease control". Since the gradual decrease control is executed, as indicated by "FIRST EMBODIMENT" in the row (C), the current value supplied to the motor 2a is decreased such that the current value supplied to the motor 2a becomes zero [A] at the time t5 before the time t6 when the vehicle speed becomes zero [km/h].

In a case of "SECOND COMPARATIVE EXAMPLE" shown in the row (C), the current value supplied to the motor 2a of the actuator 2 (see FIG. 1) is decreased to zero [A] when the vehicle is at a stop (i.e. in a period from t6 to t8). On the other hand, in the case of the example shown in FIG. 3 to which the stabilizer control device 100 according to the first embodiment is applied, as indicated by "FIRST EMBODIMENT" in the row (C), the current value supplied to the motor 2a of the actuator 2 is decreased to zero [A] when the vehicle is moving (i.e. in the period from t4 to t5), and thereby the rotation angle of the right stabilizer bar 1R (see FIG. 1) with respect to the left stabilizer bar 1L (see FIG. 1) is decreased.

Therefore, in the case of the example shown in FIG. 3 to which the stabilizer control device 100 according to the first embodiment is applied, the possibility that a behavior of the stabilizer control device 100 gives a passenger a feeling of strangeness when the vehicle is at a stop (i.e. after the time t6) can be more suppressed, as compared with the case indicated by "SECOND COMPARATIVE EXAMPLE" in the row (C) where the current value supplied to the motor 2a of the actuator 2 is decreased to zero [A] when the vehicle is at a stop (i.e. in a period from t6 to t8).

More specifically, in a case of "FIRST COMPARATIVE EXAMPLE" shown in the row (C), the current value supplied to the motor 2a of the actuator 2 (see FIG. 1) is decreased and becomes zero [A] at the time t6 when the vehicle speed becomes zero [km/h] (i.e. the vehicle stops). In this case, there is no period from the time when the current value supplied to the motor 2a of the actuator 2 becomes zero [A] to the time when the vehicle stops.

On the other hand, in the case of the example shown in FIG. 3 to which the stabilizer control device 100 according to the first embodiment is applied, in the period from t4 to t5 (i.e. when the vehicle is decelerating), the current value supplied to the motor 2a of the actuator 2 is decreased to zero [A], and thereby the rotation angle of the right stabilizer bar 1R with respect to the left stabilizer bar 1L is decreased. Thereafter, in the period from t5 to t6 (i.e. when the vehicle is decreasing), a vehicle behavior until the vehicle completely stops (i.e. a vehicle behavior during deceleration) is used for returning the vehicle body to a proper position.

Therefore, in the case of the example shown in FIG. 3 to which the stabilizer control device 100 according to the first embodiment is applied, the possibility that the vehicle body is not at a proper position when the vehicle is at a stop (i.e. after the time t6) can be more suppressed, as compared with the "FIRST COMPARATIVE EXAMPLE" and the "SECOND COMPARATIVE EXAMPLE" indicated in the row (C) where the current value supplied to the motor 2a of the actuator 2 is decreased to zero [A] when the vehicle is at a stop (i.e. in the period from t6 to t8).

That is, in the case of the example shown in FIG. 3 to which the stabilizer control device 100 according to the first embodiment is applied, the possibility that the passenger has a feeling of strangeness and a vehicle attitude remains in an improper state when the vehicle is at a stop (i.e. after the time t6) can be more suppressed, as compared with the "FIRST COMPARATIVE EXAMPLE" and the "SECOND COMPARATIVE EXAMPLE" indicated in the row (C) where the current value supplied to the motor 2a of the actuator 2 is decreased to zero [A] when the vehicle is at a stop (i.e. in the period from t6 to t8).

In the example shown in FIG. 3 to which the stabilizer control device 100 according to the first embodiment is applied, a decrease gradient of the current value during the period from t4 to t5 (see FIG. 3) when the gradual decrease control is executed at Step S105 (see FIG. 2) is set such that the time t5 when the current value supplied to the motor 2a of the actuator 2 becomes zero [A] comes earlier than the time t6 when the vehicle speed becomes zero [km/h] (i.e. the vehicle stops).

The decrease gradient of the current value may be a fixed value which is predetermined based on experimental results and the like. Alternatively, the decrease gradient of the current value may be a variable which varies depending on a deceleration of the vehicle.

Figure 4:
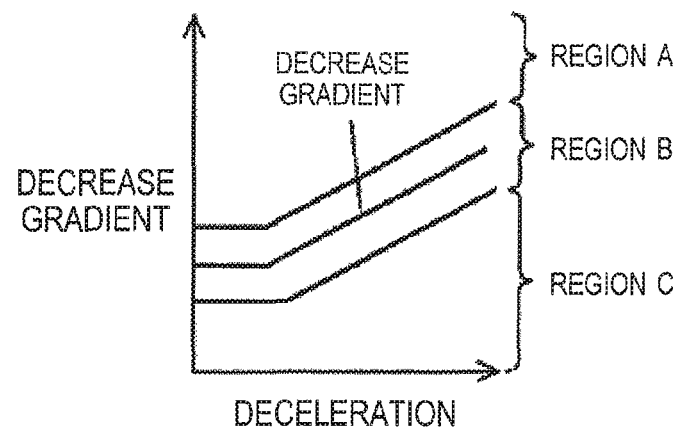
FIG. 4 is a diagram showing a relationship between a deceleration (deceleration acceleration) of a vehicle and a decrease gradient of a control amount of a motor 2a of an actuator 2.

When such the variable is used as the decrease gradient of the current value, information indicating a relationship between the deceleration of the vehicle and the decrease gradient of the current value as shown in FIG. 4 may be stored in a ROM (not shown) of the ECU 10 (see FIG. 1), for example. In this case, the decrease gradient of the current value can be calculated, by the ECU 10, based on the relationship and the deceleration of the vehicle.

FIG. 4 is a diagram showing the relationship between the deceleration of the vehicle and the decrease gradient of the control amount of the motor 2a of the actuator 2 (more specifically, the decrease gradient of the current value supplied to the motor 2a of the actuator 2). In the example shown in FIG. 4, the decrease gradient of the control amount of the actuator 2 (for example, the decrease gradient of the current value supplied to the motor 2a) becomes higher as the deceleration of the vehicle becomes higher (or as a change rate of a stroke amount to be described later becomes larger).

If a curve indicated by "DECREASE GRADIENT" in FIG. 4 is set to a region A, the decrease gradient of the current value supplied to the motor 2a of the actuator 2 tends to be high. In this case, during a period when the current value is decreasing, a change rate of the rotation angle of the right stabilizer bar 1R with respect to the left stabilizer bar 1L (see FIG. 1) tends to be high. Therefore, a behavior of the stabilizer control device 100 may give a passenger a feeling of strangeness.

Moreover, if the curve indicated by "DECREASE GRADIENT" in FIG. 4 is set to a region C, the decrease gradient of the current value supplied to the motor 2a of the actuator 2 tends to be low. In this case, there is a possibility that a period from the time when the current value becomes zero to the time when the vehicle stops vanishes and thus a vehicle behavior during the period cannot be used for returning the vehicle body to a proper position.

In view of the above, in the example shown in FIG. 4 to which the stabilizer control device 100 according to the first embodiment is applied, the curve indicated by "DECREASE GRADIENT" in FIG. 4 is set to a region B between the region A and the region C.

That is, in the example shown in FIG. 4 to which the stabilizer control device 100 according to the first embodiment is applied, the gradual decrease control at Step S105 (see FIG. 2) is executed under a condition that the decrease gradient of the control amount of the actuator 2 (for example, the decrease gradient of the current value supplied to the motor 2a) is set to a higher value as the deceleration of the vehicle becomes higher.

Therefore, in the example shown in FIG. 4 to which the stabilizer control device 100 according to the first embodiment is applied, it is possible to suppress a possibility that a time required for the vehicle body to return to the proper position after the control amount of the actuator 2 becomes zero cannot be secured, as compared with a case where the deceleration of the vehicle is high but the decrease gradient of the control amount of the actuator 2 is low.

In the example shown in FIG. 3 to which the stabilizer control device 100 (sec FIG. 1) according to the first embodiment is applied, the angle feedback control for suppressing roll of the vehicle body is executed in the period from the time t1 to the time t4 when the vehicle speed reaches the first threshold value VT being the low speed.

In the example indicated by "SECOND COMPARATIVE EXAMPLE" in the row (C), in the period from t4 to t7, for example, a holding current is supplied from the ECU 10 (see FIG. 1) to the motor 2a of the actuator 2 (see FIG. 1) under a condition that the vehicle is located over a step and thus the vehicle body is inclined. After that, for example, an ignition switch (not shown) is turned OFF at the time t7, and the current value supplied to the motor 2a of the actuator 2 is decreased to zero [A] in a period from t7 to t8.

Second Embodiment

A second embodiment of a stabilizer control device according to the present invention will be described hereinafter.

The stabilizer control device 100 according to the second embodiment is configured similarly to the stabilizer control device 100 according to the first embodiment shown in FIG. 1, except for some points to be described later. Therefore, the stabilizer control device 100 according to the second embodiment can achieve similar effects to those in the case of the stabilizer control device 100 according to the first embodiment, except for some points to be described later.

In the example shown in FIG. 1 to which the stabilizer control device 100 according to the second embodiment is applied, the stabilizer control device 100 includes the deceleration sensor 20*b*, the brake sensor 20*c*, the stroke sensor 20*f*, the deceleration determination unit 10*c*, the stroke amount determination unit 10*e*, the stroke amount change rate determination unit 10*f*, and the deceleration estimation unit 10*g*. In another example to which the stabilizer control device 100 according to the second embodiment is applied, the deceleration sensor 20*b*, the brake sensor 20*c*, the stroke sensor 20*f*, the deceleration determination unit 10*c*, the stroke amount determination unit 10*e*, the stroke amount change rate determination unit 10*f*, and the deceleration estimation unit 10*g* are omitted.

In the example shown in FIG. 2 to which the stabilizer control device 100 according to the first embodiment is applied, as described above, when the deceleration determination unit 10*c* (see FIG. 1) determines that the vehicle is decelerating, the vehicle state transition determination unit 10*h* (see FIG. 1) determines, at Step S102, that the vehicle state is in transition from the moving state to the stopped state. On the other hand, when the deceleration determination unit 10*c* determines that the vehicle is not decelerating, the vehicle state transition determination unit 10*h* determines, at Step S102, that the vehicle state is not in transition from the moving state to the stopped state.

In an example shown in FIG. 2 to which the stabilizer control device 100 (see FIG. 1) according to the second embodiment is applied, when the pitch behavior determination unit 10*d* (see FIG. 1) determines that the pitch behavior of the vehicle is occurring, the vehicle state transition determination unit 10*h* determines, at Step S102, that the vehicle state is in transition from the moving state to the stopped state. On the other hand, when the pitch behavior determination unit 10*d* determines that the pitch behavior of the vehicle is not occurring, the vehicle state transition determination unit 10*h* determines, at Step S102, that the vehicle state is not in transition from the moving state to the stopped state.

In the example shown in FIG. 2 to which the stabilizer control device 100 according to the second embodiment is applied, the gradual decrease control at Step S105 is executed if Step S100 determines that the vehicle is moving, Step S101 determines that the vehicle speed is less than the first threshold value VT, Step S102 determines that the pitch behavior of the vehicle is occurring and thus the vehicle state is in transition from the moving state to the stopped state, and Step S103 determines that the control amount of the actuator 2 (see FIG. 1) is not zero (for example, the current instruction value supplied from the ECU 10 to the motor 2*a* is not zero [A]). At Step S105, the control amount of the actuator 2 is decreased (for example, the current value supplied to the motor 2*a* is decreased) such that the rotation angle of the rotor with respect to the stator of the motor 2*a* becomes zero [deg] and the rotation angle of the right stabilizer bar 1R with respect to the left stabilizer bar 1L becomes zero [deg] before the vehicle speed becomes zero.

The control executed by the stabilizer control device 100 (see FIG. 1) according to the second embodiment will be described below with reference to the timing chart shown in FIG. 3.

In the example shown in FIG. 3 to which the stabilizer control device 100 according to the second embodiment is applied, as shown in the row (A), the vehicle speed starts to decrease from V1 [km/h] at the time t3. Then, after a time t3', a pitch behavior of the vehicle occurs. Meanwhile, the vehicle speed does not reach the first threshold value VT [km/h] until the time t4.

Therefore, in the period from t3 to t4, the determination at Step S100 (see FIG. 2) results in "YES", the determination at Step S101 (see FIG. 2) results in "NO", and thus Step S104 (see FIG. 2) is executed. As a result, as shown in the row (B), the state of the control executed by the stabilizer control device 100 is the "angle feedback control". Since the angle feedback control is executed, the current value (i.e. the "actual current value" shown in the row (C)) supplied from the ECU 10 (see FIG. 1) to the motor 2*a* varies depending on changes in the vehicle speed, steering angle and the like, as show in the row (C).

Next, in the example shown in FIG. 3 to which the stabilizer control device 100 according to the second embodiment is applied, as shown in the row (A), the vehicle speed is less than the first threshold value VT after the time t4. At the time t6, the vehicle speed reaches zero [km/h].

More specifically, in the example shown in FIG. 3 to which the stabilizer control device 100 according to the second embodiment is applied, in the period from t4 to t5, the determination at Step S100 results in "YES", the determination at Step S101 results in "YES", the determination at Step S102 (see FIG. 2) results in "YES", the determination at Step S103 (see FIG. 2) results in "NO", and thus Step S105 is executed. As a result, as shown in the row (B), the state of the control executed by the stabilizer control device 100 is the "gradual decrease control". Since the gradual decrease control is executed, as indicated by "FIRST EMBODIMENT" in the row (C), the current value supplied to the motor 2*a* is decreased such that the current value supplied to the motor 2*a* becomes zero [A] at the time t5 before the time t6 when the vehicle speed becomes zero [km/h]. More specifically, the current value supplied to the motor 2*a* is decreased such that the current value supplied to the motor 2*a* becomes zero [A] during the period when the pitch behavior of the vehicle is occurring.

In the case of "SECOND COMPARATIVE EXAMPLE" shown in the row (C), the current value supplied to the motor 2*a* of the actuator 2 (see FIG. 1) is decreased to zero [A] when the vehicle is at a stop (i.e. in a period from t6 to t8). On the other hand, in the case of the example shown in FIG. 3 to which the stabilizer control device 100 according to the second embodiment is applied, as indicated by "FIRST EMBODIMENT" in the row (C), the current value supplied to the motor 2*a* of the actuator 2 is decreased to zero [A] when the vehicle is moving (i.e. in the period from t4 to t5), and thereby the rotation angle of the right stabilizer bar 1R (see FIG. 1) with respect to the left stabilizer bar 1L (see FIG. 1) is decreased.

Therefore, in the case of the example shown in FIG. 3 to which the stabilizer control device 100 according to the second embodiment is applied, the possibility that a behavior of the stabilizer control device 100 gives a passenger a feeling of strangeness when the vehicle is at a stop (i.e. after the time t6) can be more suppressed, as compared with the case indicated by "SECOND COMPARATIVE EXAMPLE" in the row (C) where the current value supplied to the motor 2*a* of the actuator 2 is decreased to zero [A] when the vehicle is at a stop (i.e. in the period from t6 to t8).

More specifically, in a case of "FIRST COMPARATIVE EXAMPLE" shown in the row (C), the current value supplied to the motor 2*a* of the actuator 2 (see FIG. 1) is decreased and becomes zero [A] at the time t6 when the vehicle speed becomes zero [km/h] (i.e. the vehicle stops).

In this case, there is no period from the time when the current value supplied to the motor 2a of the actuator 2 becomes zero [A] to the time when the vehicle stops.

On the other hand, in the case of the example shown in FIG. 3 to which the stabilizer control device 100 according to the second embodiment is applied, in the period from t4 to t5, the current value supplied to the motor 2a of the actuator 2 is decreased to zero [A], and thereby the rotation angle of the right stabilizer bar 1R with respect to the left stabilizer bar 1L is decreased. Thereafter, in the period from t5 to t6 (i.e. when the pitch behavior of the vehicle is occurring), the pitch behavior of the vehicle until the vehicle completely stops is used for returning the vehicle body to a proper position.

Therefore, in the case of the example shown in FIG. 3 to which the stabilizer control device 100 according to the second embodiment is applied, the possibility that the vehicle body is not at a proper position when the vehicle is at a stop (i.e. after the time t6) can be more suppressed, as compared with the "FIRST COMPARATIVE EXAMPLE" and the "SECOND COMPARATIVE EXAMPLE" indicated in the row (C) where the current value supplied to the motor 2a of the actuator 2 is decreased to zero [A] when the vehicle is at a stop (i.e. in the period from t6 to t8).

More specifically, in the case of the example shown in FIG. 3 to which the stabilizer control device 100 according to the second embodiment is applied, it is possible to more certainly return the vehicle body to the proper position, as compared with a case where the pitch behavior of the vehicle does not occur in the period from the time t5 when the current value supplied to the motor 2a of the actuator 2 is decreased to zero [A] to the time t6 when the vehicle completely stops.

In the example shown in FIG. 3 to which the stabilizer control device 100 according to the second embodiment is applied, as described above, the pitch behavior of the vehicle occurs during the period from t4 to t5 when the gradual decrease control is executed at Step S105 (see FIG. 2) and the current value supplied to the motor 2a (see FIG. 1) of the actuator 2 is decreased to zero [A]. That is, the gradual decrease control is executed concurrently with the pitch behavior of the vehicle. More specifically, for example, at around the time t4, the gradual decrease control is executed concurrently with the vehicle behavior where a rear wheel side of the vehicle body is raised due to the deceleration of the vehicle. Moreover, at around the time t5, the gradual decrease control is executed concurrently with the vehicle behavior where the raised rear wheel side of the vehicle body returns.

Therefore, in the case of the example shown in FIG. 3 to which the stabilizer control device 100 according to the second embodiment is applied, it is possible to suppress the possibility that the passenger has a feeling of strangeness during the period from t4 to t5 when the gradual decrease control is executed, as compared with a case where the gradual decrease control is executed when the pitch behavior of the vehicle is not occurring.

In the example shown in FIG. 3 to which the stabilizer control device 100 according to the second embodiment is applied, the first threshold value VT is set such that the vehicle speed becomes less than the first threshold value VT after the time t4 after the time t3' when the pitch behavior of the vehicle occurs. In another example to which the stabilizer control device 100 according to the second embodiment is applied, the first threshold value VT is set such that the control amount of the actuator 2 (see FIG. 1) certainly becomes zero (for example, the current value supplied to the motor 2a certainly becomes zero [A]) when the pitch behavior of the vehicle is occurring.

That is, in the other example to which the stabilizer control device 100 according to the second embodiment is applied, by setting the first threshold value VT (see the row (A)) to a large value, it is possible to advance (expedite) a timing of starting the gradual decrease control for decreasing the control amount of the actuator 2 from the time t4 to be the time t3' (see FIG. 3) and thus to advance (expedite) a timing when the control amount of the actuator 2 becomes zero (for example, the current value supplied to the motor 2a becomes zero [A]) from the time t5 (see FIG. 3). As a result, it is possible to secure the time required for the vehicle body to return to a proper position (i.e. the period when the pitch behavior of the vehicle is occurring) after the control amount of the actuator 2 becomes zero.

In the example shown in FIG. 3 to which the stabilizer control device 100 according to the second embodiment is applied, the decrease gradient of the current value of the motor 2a during the period from t4 to t5 is set such that the control amount of the actuator 2 (see FIG. 1) becomes zero (for example, the current value supplied to the motor 2a becomes zero [A]) in the period t3' to t6 when the pitch behavior of the vehicle is occurring.

That is, in the example shown in FIG. 3 to which the stabilizer control device 100 according to the second embodiment is applied, the decrease gradient of the control amount of the actuator 2 (for example, the decrease gradient of the current value supplied to the motor 2a) during the period from t4 to t5 when the gradual decrease control is executed is set to a higher value than that in the case indicated by "FIRST COMPARATIVE EXAMPLE" in the row (C). It is thus possible to reduce a time required for the control amount of the actuator 2 to become zero (for example, a time required for the current value supplied to the motor 2a becomes zero [A]). It is thus possible to advance (expedite) the timing t5 when the control amount of the actuator 2 becomes zero, as compared with the case indicated by "FIRST COMPARATIVE EXAMPLE" in the row (C). As a result, it is possible to secure the period from t5 to t6 required for the vehicle body to return to a proper position after the control amount of the actuator 2 becomes zero in the period t3' to t6 when the pitch behavior of the vehicle is occurring.

Third Embodiment

A third embodiment of a stabilizer control device according to the present invention will be described hereinafter.

The stabilizer control device 100 according to the third embodiment is configured similarly to the stabilizer control device 100 according to the first embodiment shown in FIG. 1, except for some points to be described later. Therefore, the stabilizer control device 100 according to the third embodiment can achieve similar effects to those in the case of the stabilizer control device 100 according to the first embodiment, except for some points to be described later.

In the example shown in FIG. 1 to which the stabilizer control device 100 according to the third embodiment is applied, the stabilizer control device 100 includes the deceleration sensor 20b, the brake sensor 20c, the vertical acceleration sensor 20e, the deceleration determination unit 10c, the pitch behavior determination unit 10d, the stroke amount change rate determination unit 10f, and the deceleration estimation unit 10g. In another example to which the stabilizer control device 100 according to the third embodiment is applied, the deceleration sensor 20b, the brake sensor 20c, the vertical acceleration sensor 20e, the deceleration determination unit 10c, the pitch behavior determination unit 10d, the stroke amount change rate determination unit 10f, and the deceleration estimation unit 10g are omitted.

In the example shown in FIG. 2 to which the stabilizer control device 100 according to the first embodiment is applied, as described above, when the deceleration determination unit 10c (see FIG. 1) determines that the vehicle is decelerating, the vehicle state transition determination unit 10h (see FIG. 1) determines, at Step S102, that the vehicle state is in transition from the moving state to the stopped state. On the other hand, when the deceleration determination unit 10c determines that the vehicle is not decelerating, the vehicle state transition determination unit 10h determines, at Step S102, that the vehicle state is not in transition from the moving state to the stopped state.

In an example shown in FIG. 2 to which the stabilizer control device 100 according to the third embodiment is applied, the stroke amount is the amount of a vertical displacement of the vehicle body of the vehicle. For example, when the vehicle is provided with a suspension apparatus, the stroke amount is an amount of contraction or expansion of the suspension apparatus. When the stroke amount determination unit 10e (see FIG. 1) determines that the stroke amount is greater than a second threshold value, the vehicle state transition determination unit 10h determines, at Step S102, that the vehicle state is in transition from the moving state to the stopped state. On the other hand, when the stroke amount determination unit 10e determines that the stroke amount is equal to or less than the second threshold value, the vehicle state transition determination unit 10h determines, at Step S102, that the vehicle state is not in transition from the moving state to the stopped state.

In the example shown in FIG. 2 to which the stabilizer control device 100 according to the third embodiment is applied, the gradual decrease control at Step S105 is executed if Step S100 determines that the vehicle is moving, Step S101 determines that the vehicle speed is less than the first threshold value VT, Step S102 determines that the stroke amount is greater than the second threshold value and thus the vehicle state is in transition from the moving state to the stopped state, and Step S103 determines that the control amount of the actuator 2 (see FIG. 1) is not zero (for example, the current instruction value supplied from the ECU 10 to the motor 2a is not zero [A]). At Step S105, the control amount of the actuator 2 is decreased (for example, the current value supplied to the motor 2a is decreased) such that the rotation angle of the rotor with respect to the stator of the motor 2a becomes zero [deg] and the rotation angle of the right stabilizer bar 1R with respect to the left stabilizer bar 1L becomes zero [deg] before the vehicle speed becomes zero.

The control executed by the stabilizer control device 100 (see FIG. 1) according to the third embodiment will be described below with reference to the timing chart shown in FIG. 3.

In the example shown in FIG. 3 to which the stabilizer control device 100 according to the third embodiment is applied, as shown in the row (A), the vehicle speed starts to decrease from V1 [km/h] at the time t3. Then, after a time t3', the stroke amount becomes greater than the second threshold value. Meanwhile, the vehicle speed does not reach the first threshold value VT [km/h] until the time t4.

Therefore, in the period from t3 to t4, the determination at Step S100 (see FIG. 2) results in "YES", the determination at Step S101 (see FIG. 2) results in "NO", and thus Step S104 (see FIG. 2) is executed. As a result, as shown in the row (B), the state of the control executed by the stabilizer control device 100 is the "angle feedback control". Since the angle feedback control is executed, the current value (i.e. the "actual current value" shown in the row (C)) supplied from the ECU 10 (see FIG. 1) to the motor 2a varies depending on changes in the vehicle speed, steering angle and the like, as show in the row (C).

Next, in the example shown in FIG. 3 to which the stabilizer control device 100 according to the third embodiment is applied, as shown in the row (A), the vehicle speed is less than the first threshold value VT after the time t4. At the time t6, the vehicle speed reaches zero [km/h].

More specifically, in the example shown in FIG. 3 to which the stabilizer control device 100 according to the third embodiment is applied, in the period from t4 to t5, the determination at Step S100 results in "YES", the determination at Step S101 results in "YES", the determination at Step S102 (see FIG. 2) results in "YES", the determination at Step S103 (see FIG. 2) results in "NO", and thus Step S105 is executed. As a result, as shown in the row (B), the state of the control executed by the stabilizer control device 100 is the "gradual decrease control". Since the gradual decrease control is executed, as indicated by "FIRST EMBODIMENT" in the row (C), the current value supplied to the motor 2a is decreased such that the current value supplied to the motor 2a becomes zero [A] at the time t5 before the time t6 when the vehicle speed becomes zero [km/h].

In the case of "SECOND COMPARATIVE EXAMPLE" shown in the row (C), the current value supplied to the motor 2a of the actuator 2 (see FIG. 1) is decreased to zero [A] when the vehicle is at a stop (i.e. in a period from t6 to t8). On the other hand, in the case of the example shown in FIG. 3 to which the stabilizer control device 100 according to the third embodiment is applied, as indicated by "FIRST EMBODIMENT" in the row (C), the current value supplied to the motor 2a of the actuator 2 is decreased to zero [A] when the vehicle is moving (i.e. in the period from t4 to t5), and thereby the rotation angle of the right stabilizer bar 1R (see FIG. 1) with respect to the left stabilizer bar 1L (see FIG. 1) is decreased.

Therefore, in the case of the example shown in FIG. 3 to which the stabilizer control device 100 according to the third embodiment is applied, the possibility that a behavior of the stabilizer control device 100 gives a passenger a feeling of strangeness when the vehicle is at a stop (i.e. after the time t6) can be more suppressed, as compared with the case indicated by "SECOND COMPARATIVE EXAMPLE" in the row (C) where the current value supplied to the motor 2a of the actuator 2 is decreased to zero [A] when the vehicle is at a stop (i.e. in the period from t6 to t8).

The stroke amount, which is the amount of the vertical displacement of the vehicle body, being large means that a displacement of the vehicle body with respect to the proper position is large. On the other hand, the stroke amount being small means that a displacement of the vehicle body with respect to the proper position is small. When the displacement of the vehicle body with respect to the proper position is large, it is highly necessary to execute, when the vehicle is moving, the gradual decrease control for decreasing the control amount of the actuator 2 to zero.

In consideration of the above, in the example shown in FIG. 3 to which the stabilizer control device 100 according to the third embodiment is applied, the first threshold value VT is set such that the vehicle speed becomes less than the first threshold value VT and the gradual decrease control is started after the time t4 after the time t3' when the stroke amount becomes greater than the second threshold value.

That is, in the example shown in FIG. 3 to which the stabilizer control device 100 according to the third embodiment is applied, the gradual decrease control for decreasing the control amount of the actuator 2 to zero is started at the time t4 when the stroke amount is sufficiently large.

Therefore, in the case of the example shown in FIG. 3 to which the stabilizer control device 100 according to the third embodiment is applied, the possibility that the vehicle body is not at the proper position when the vehicle is at a stop (i.e. after the time t6) can be more suppressed, as compared with a case where the gradual decrease control for decreasing the control amount of the actuator 2 to zero is not started when the displacement of the vehicle body with respect to the proper position is large.

Moreover, in the example shown in FIG. 3 to which the stabilizer control device 100 according to the third embodiment is applied, in the period during which the control amount of the actuator 2 is decreased to zero (i.e. the period from t4 to t5) or after the control amount of the actuator 2 is decreased to zero (i.e. the period from t5 to t6), it is possible to return the vehicle body to the proper position by using a vehicle behavior associated with the decrease in the stroke amount being the amount of the vertical displacement of the vehicle body from the second threshold value to zero.

That is, in the case of the example shown in FIG. 3 to which the stabilizer control device 100 according to the third embodiment is applied, it is possible to more certainly return the vehicle body to the proper position, as compared with a case where the vehicle behavior, which is associated with the decrease in the stroke amount being the amount of the vertical displacement of the vehicle body from the second threshold value to zero, does not occur after the time t4 when the gradual decrease control for decreasing the control amount of the actuator 2 to zero is started.

In another example to which the stabilizer control device 100 according to the third embodiment is applied, the first threshold value VT is set such that the control amount of the actuator 2 (see FIG. 1) certainly becomes zero (for example, the current value supplied to the motor 2a certainly becomes zero [A]) when the vehicle is moving.

More specifically, in the other example to which the stabilizer control device 100 according to the third embodiment is applied, the first threshold value VT is set such that the vehicle speed becomes less than the first threshold value VT and the gradual decrease control is started at the time t3' when the stroke amount becomes greater than the second threshold value.

That is, in the other example to which the stabilizer control device 100 according to the third embodiment is applied, by setting the first threshold value VT (see the row (A)) to a large value, it is possible to advance (expedite) a timing of starting the gradual decrease control for decreasing the control amount of the actuator 2 from the time t4 to be the time t3' (see FIG. 3) and thus to advance (expedite) a timing when the control amount of the actuator 2 becomes zero (for example, the current value supplied to the motor 2a becomes zero [A]) from the time t5 (see FIG. 3). As a result, it is possible to secure the time required for the vehicle body to return to a proper position after the control amount of the actuator 2 becomes zero.

In the example shown in FIGS. 2 and 3 to which the stabilizer control device 100 according to the third embodiment is applied, if the stroke amount becomes equal to or less than the second threshold value after Step S105 (see FIG. 2) is executed at the time t4 (see FIG. 3) and the gradual decrease control is started, the determination at Step S102 (see FIG. 2) results in "NO" and thus Step S104 is executed to resume the angle feedback control.

In another example to which the stabilizer control device 100 according to the third embodiment is applied, even if the stroke amount becomes equal to or less than the second threshold value after Step S105 (see FIG. 2) is executed at the time t4 (see FIG. 3) and the gradual decrease control is started, the gradual decrease control is continued until the control amount of the actuator 2 becomes zero.

Fourth Embodiment

A fourth embodiment of a stabilizer control device according to the present invention will be described hereinafter.

The stabilizer control device 100 according to the fourth embodiment is configured similarly to the stabilizer control device 100 according to the first embodiment shown in FIG. 1, except for some points to be described later. Therefore, the stabilizer control device 100 according to the fourth embodiment can achieve similar effects to those in the case of the stabilizer control device 100 according to the first embodiment, except for some points to be described later.

In the example shown in FIG. 1 to which the stabilizer control device 100 according to the fourth embodiment is applied, the stabilizer control device 100 includes the deceleration sensor 20b, the brake sensor 20c, the vertical acceleration sensor 20e, the deceleration determination unit 10c, the pitch behavior determination unit 10d, the stroke amount determination unit 10e, and the deceleration estimation unit 10g. In another example to which the stabilizer control device 100 according to the fourth embodiment is applied, the deceleration sensor 20b, the brake sensor 20c, the vertical acceleration sensor 20e, the deceleration determination unit 10c, the pitch behavior determination unit 10d, the stroke amount determination unit 10e, and the deceleration estimation unit 10g are omitted.

In the example shown in FIG. 2 to which the stabilizer control device 100 according to the first embodiment is applied, as described above, when the deceleration determination unit 10c (see FIG. 1) determines that the vehicle is decelerating, the vehicle state transition determination unit 10h (see FIG. 1) determines, at Step S102, that the vehicle state is in transition from the moving state to the stopped state. On the other hand, when the deceleration determination unit 10c determines that the vehicle is not decelerating, the vehicle state transition determination unit 10h determines, at Step S102, that the vehicle state is not in transition from the moving state to the stopped state.

In an example shown in FIG. 2 to which the stabilizer control device 100 according to the fourth embodiment is applied, the stroke amount is the amount of a vertical displacement of the vehicle body of the vehicle. For example, when the vehicle is provided with a suspension apparatus, the stroke amount is an amount of contraction or expansion of the suspension apparatus. When the stroke amount change rate determination unit 10f (see FIG. 1) determines that the change rate of the stroke amount is greater than a third threshold value, the vehicle state transition determination unit 10h determines, at Step S102, that the vehicle state is in transition from the moving state to the stopped state. On the other hand, when the stroke amount change rate determination unit 10f determines that the change rate of the stroke amount is equal to or less than the third threshold value, the vehicle state transition determination unit 10h determines, at Step S102, that the vehicle state is not in transition from the moving state to the stopped state.

In the example shown in FIG. 2 to which the stabilizer control device 100 according to the fourth embodiment is applied, the gradual decrease control at Step S105 is executed if Step S100 determines that the vehicle is moving, Step S101 determines that the vehicle speed is less than the first threshold value VT, Step S102 determines that the change rate of the stroke amount is greater than the third threshold value and thus the vehicle state is in transition from the moving state to the stopped state, and Step S103 determines that the control amount of the actuator 2 (see FIG. 1) is not zero (for example, the current instruction value supplied from the ECU 10 to the motor 2a is not zero [A]). At Step S105, the control amount of the actuator 2 is decreased (for example, the current value supplied to the motor 2a is decreased) such that the rotation angle of the rotor with respect to the stator of the motor 2a becomes zero [deg] and the rotation angle of the right stabilizer bar 1R with respect to the left stabilizer bar 1L becomes zero [deg] before the vehicle speed becomes zero.

The control executed by the stabilizer control device 100 (see FIG. 1) according to the fourth embodiment will be described below with reference to the timing chart shown in FIG. 3.

In the example shown in FIG. 3 to which the stabilizer control device 100 according to the fourth embodiment is applied, as shown in the row (A), the vehicle speed starts to decrease from V1 [km/h] at the time t3. Then, after a time t3', the change rate of the stroke amount becomes greater than the third threshold value. Meanwhile, the vehicle speed does not reach the first threshold value VT [km/h] until the time t4.

Therefore, in the period from t3 to t4, the determination at Step S100 (see FIG. 2) results in "YES", the determination at Step S101 (see FIG. 2) results in "NO", and thus Step S104 (see FIG. 2) is executed. As a result, as shown in the row (B), the state of the control executed by the stabilizer control device 100 is the "angle feedback control". Since the angle feedback control is executed, the current value (i.e. the "actual current value" shown in the row (C)) supplied from the ECU 10 (see FIG. 1) to the motor 2a varies depending on changes in the vehicle speed, steering angle and the like, as show in the row (C).

Next, in the example shown in FIG. 3 to which the stabilizer control device 100 according to the fourth embodiment is applied, as shown in the row (A), the vehicle speed is less than the first threshold value VT after the time t4. At the time t6, the vehicle speed reaches zero [km/h].

More specifically, in the example shown in FIG. 3 to which the stabilizer control device 100 according to the fourth embodiment is applied, in the period from t4 to t5, the determination at Step S100 results in "YES", the determination at Step S101 results in "YES", the determination at Step S102 (see FIG. 2) results in "YES", the determination at Step S103 (see FIG. 2) results in "NO", and thus Step S105 is executed. As a result, as shown in the row (B), the state of the control executed by the stabilizer control device 100 is the "gradual decrease control". Since the gradual decrease control is executed, as indicated by "FIRST EMBODIMENT" in the row (C), the current value supplied to the motor 2a is decreased such that the current value supplied to the motor 2a becomes zero [A] at the time t5 before the time t6 when the vehicle speed becomes zero [km/h].

In the case of "SECOND COMPARATIVE EXAMPLE" shown in the row (C), the current value supplied to the motor 2a of the actuator 2 (see FIG. 1) is decreased to zero [A] when the vehicle is at a stop (i.e. in a period from t6 to t8). On the other hand, in the case of the example shown in FIG. 3 to which the stabilizer control device 100 according to the fourth embodiment is applied, as indicated by "FIRST EMBODIMENT" in the row (C), the current value supplied to the motor 2a of the actuator 2 is decreased to zero [A] when the vehicle is moving (i.e. in the period from t4 to t5), and thereby the rotation angle of the right stabilizer bar 1R (see FIG. 1) with respect to the left stabilizer bar 1L (see FIG. 1) is decreased.

Therefore, in the case of the example shown in FIG. 3 to which the stabilizer control device 100 according to the fourth embodiment is applied, the possibility that a behavior of the stabilizer control device 100 gives a passenger a feeling of strangeness when the vehicle is at a stop (i.e. after the time t6) can be more suppressed, as compared with the case indicated by "SECOND COMPARATIVE EXAMPLE" in the row (C) where the current value supplied to the motor 2a of the actuator 2 is decreased to zero [A] when the vehicle is at a stop (i.e. in the period from t6 to t8).

The change rate of the stroke amount which is the amount of the vertical displacement of the vehicle body being high means that a vehicle behavior is rapid.

In consideration of the above, in the example shown in FIG. 3 to which the stabilizer control device 100 according to the fourth embodiment is applied, the gradual decrease control for decreasing the control amount of the actuator 2 (see FIG. 1) to zero (for example, decreasing the current value supplied to the motor 2a to zero [A]) is started at the time t4 when the change rate of the stroke amount is large and the vehicle behavior is rapid.

Therefore, in the example shown in FIG. 3 to which the stabilizer control device 100 according to the fourth embodiment is applied, it is possible to return the vehicle body to the proper position by using the rapid vehicle behavior in the period during which the control amount of the actuator 2 is decreased to zero or the rapid vehicle behavior after the control amount of the actuator 2 is decreased to zero.

That is, in the case of the example shown in FIG. 3 to which the stabilizer control device 100 according to the fourth embodiment is applied, it is possible to more certainly return the vehicle body to the proper position, as compared with a case where the rapid vehicle behavior does not occur after the time t4 when the gradual decrease control for decreasing the control amount of the actuator 2 to zero is started.

In another example to which the stabilizer control device 100 according to the fourth embodiment is applied, the first threshold value VT is set such that the control amount of the actuator 2 (see FIG. 1) certainly becomes zero (for example, the current value supplied to the motor 2a certainly becomes zero [A]) when the vehicle is moving.

More specifically, in the other example to which the stabilizer control device 100 according to the fourth embodiment is applied, the first threshold value VT is set such that the vehicle speed becomes less than the first threshold value VT and the gradual decrease control is started at the time t3' when the change rate of the stroke amount becomes greater than the third threshold value.

That is, in the other example to which the stabilizer control device 100 according to the fourth embodiment is applied, by setting the first threshold value VT (see the row (A)) to a large value, it is possible to advance (expedite) a timing of starting the gradual decrease control for decreasing the control amount of the actuator 2 from the time t4 to be the time t3' (see FIG. 3) and thus to advance (expedite) a timing when the control amount of the actuator 2 becomes zero (for example, the current value supplied to the motor 2a becomes zero [A]) from the time t5 (see FIG. 3). As a result, it is possible to secure the time required for the vehicle body to return to a proper position after the control amount of the actuator 2 becomes zero.

In the example shown in FIG. 3 to which the stabilizer control device 100 according to the fourth embodiment is applied, the decrease gradient of the current value of the motor 2a during the period from t4 to t5 is set such that the control amount of the actuator 2 (see FIG. 1) becomes zero (for example, the current value supplied to the motor 2a becomes zero [A]) in the period t3' to t6 when the vehicle behavior is rapid.

That is, in the example shown in FIG. 3 to which the stabilizer control device 100 according to the fourth embodiment is applied, the decrease gradient of the control amount of the actuator 2 (for example, the decrease gradient of the current value supplied to the motor 2a) during the period from t4 to t5 when the gradual decrease control is executed is set to a higher value than that in the case indicated by "FIRST COMPARATIVE EXAMPLE" in the row (C). It is thus possible to reduce a time required for the control amount of the actuator 2 to become zero (for example, a time required for the current value supplied to the motor 2a becomes zero [A]). It is thus possible to advance (expedite) the timing t5 when the control amount of the actuator 2 becomes zero, as compared with the case indicated by "FIRST COMPARATIVE EXAMPLE" in the row (C). As a result, it is possible to secure the period from t5 to t6 required for the vehicle body to return to a proper position after the control amount of the actuator 2 becomes zero in the period t3' to t6 when the vehicle behavior is rapid.

In the example shown in FIGS. 2 and 3 to which the stabilizer control device 100 according to the fourth embodiment is applied, if the change rate of the stroke amount becomes equal to or less than the third threshold value after Step S105 (see FIG. 2) is executed at the time t4 (see FIG. 3) and the gradual decrease control is started, the determination at Step S102 (see FIG. 2) results in "NO" and thus Step S104 is executed to resume the angle feedback control.

In another example to which the stabilizer control device 100 according to the fourth embodiment is applied, even if the change rate of the stroke amount becomes equal to or less than the third threshold value after Step S105 (see FIG. 2) is executed at the time t4 (see FIG. 3) and the gradual decrease control is started, the gradual decrease control is continued until the control amount of the actuator 2 becomes zero.

Fifth Embodiment

A fifth embodiment of a stabilizer control device according to the present invention will be described hereinafter.

The stabilizer control device 100 according to the fifth embodiment is configured similarly to the stabilizer control device 100 according to the first embodiment shown in FIG. 1, except for some points to be described later. Therefore, the stabilizer control device 100 according to the fifth embodiment can achieve similar effects to those in the case of the stabilizer control device 100 according to the first embodiment, except for some points to be described later.

In the example shown in FIG. 1 to which the stabilizer control device 100 according to the fifth embodiment is applied, the stabilizer control device 100 includes the deceleration sensor 20b, the brake sensor 20c, the vertical acceleration sensor 20e, the stroke sensor 20f, the pitch behavior determination unit 10d, the stroke amount determination unit 10e, the stroke amount change rate determination unit 10f, and the deceleration estimation unit 10g. In another example to which the stabilizer control device 100 according to the fifth embodiment is applied, the deceleration sensor 20b, the brake sensor 20c, the vertical acceleration sensor 20e, the stroke sensor 20f, the pitch behavior determination unit 10d, the stroke amount determination unit 10e, the stroke amount change rate determination unit 10f, and the deceleration estimation unit 10g are omitted.

Figure 5:
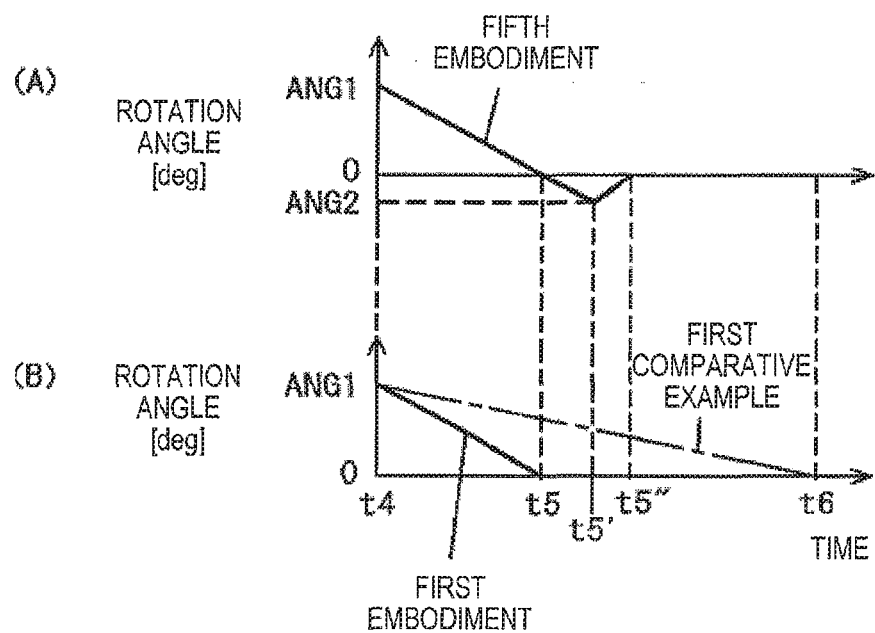
FIG. 5 is a timing chart for explaining a gradual decrease control executed in the stabilizer control device 100 according to a fifth embodiment.

FIG. 5 is a timing chart for explaining the gradual decrease control executed in the stabilizer control device 100 (see FIG. 1) according to the fifth embodiment.

More specifically, a row (A) in FIG. 5 indicates the rotation angle [deg] of the right stabilizer bar 1R with respect to the left stabilizer bar 1L (see FIG. 1) during execution of the gradual decrease control by the stabilizer control device 100 according to the fifth embodiment. A solid line in a row (B) in FIG. 5 indicates the rotation angle [deg] of the right stabilizer bar 1R with respect to the left stabilizer bar 1L during execution of the gradual decrease control by the stabilizer control device 100 according to the first embodiment. A dashed-dotted line in the row (B) in FIG. 5 indicates the rotation angle [deg] of the right stabilizer bar 1R with respect to the left stabilizer bar 1L during execution of the gradual decrease control in the case of the first comparative example. Times t4 and t5 in FIG. 5 respectively correspond to the times t4 and t5 in FIG. 3.

In the example to which the stabilizer control device 100 according to the first embodiment is applied, as shown in FIG. 3 and the row (B) in FIG. 5, the vehicle speed is less than the first threshold value VT after the time t4, and the vehicle speed becomes zero [km/h] at the time t6. The gradual decrease control at Step S105 (see FIG. 2) is executed in the period from t4 to t5.

More specifically, in the example to which the stabilizer control device 100 according to the first embodiment is applied, as indicated by "FIRST EMBODIMENT" in the row (C) in FIG. 3, the current value supplied to the motor 2a is decreased such that the current value supplied to the motor 2a becomes zero [A] at the time t5. As a result, as indicated by "FIRST EMBODIMENT" in the row (B) in FIG. 5, the rotation angle [deg] of the right stabilizer bar 1R with respect to the left stabilizer bar 1L starts to decrease from a value ANG1 (>0) [deg] at the time t4 and then becomes zero [deg] at the time t5.

For example, let us consider a case where the stabilizer control device 100 (see FIG. 1) is applied to the vehicle having a suspension apparatus (not shown) and friction of the suspension apparatus is large. In this case, just decreasing the control amount of the actuator 2 to zero without overshooting zero when the vehicle is moving may not enough for the vehicle body to return to the proper position. That is, the vehicle body may not return to the proper position in the case indicated by "FIRST EMBODIMENT" in the row (B) in FIG. 5 where the rotation angle [deg] of the right stabilizer bar 1R with respect to the left stabilizer bar 1L is just decreased to zero [deg] without overshooting zero [deg].

In consideration of the above, in the example shown in the row (A) in FIG. 5 to which the stabilizer control device 100 according to the fifth embodiment is applied, the control amount of the actuator 2 once overshoots zero at a time t5' and then is decreased to zero at a time t5" before the time t6 when the vehicle speed becomes zero. As a result, as shown in the row (A) in FIG. 5, the rotation angle [deg] of the right stabilizer bar 1R with respect to the left stabilizer bar 1L overshoots zero [deg] to be a value ANG2 (<0) [deg] at the time t5' and then is decreased to zero at the time t5" before the time t6 when the vehicle speed becomes zero.

Therefore, in the case of the example shown in the row (A) in FIG. 5 to which the stabilizer control device 100 according to the fifth embodiment is applied, the possibility that the vehicle body does not return to the proper position can be more suppressed, as compared with the examples indicated by "FIRST EMBODIMENT" and "FIRST COMPARATIVE EXAMPLE" in the row (B) in FIG. 5 where the control amount of the actuator 2 is decreased to zero without overshooting zero.

Sixth Embodiment

In a sixth embodiment of the stabilizer control device according to the present invention, some of the first to fifth embodiments and examples of the stabilizer control device according to the present invention described above can be combined with each other as appropriate.

What is claimed is:

1. A stabilizer control device comprising:
a left stabilizer bar and a right stabilizer bar provided between a left wheel and a right wheel of a vehicle;
an actuator provided between the left stabilizer bar and the right stabilizer bar;
a sensor that detects a control amount of the actuator; and
a control unit configured to:
control the actuator to control a rotation angle of the right stabilizer bar with respect to the left stabilizer bar;
determine whether or not the vehicle is moving;
determine whether or not a speed of the vehicle is less than a first threshold value; and
determine whether or not a state of the vehicle is in transition from a moving state to a stopped state
wherein when the vehicle is moving, the speed of the vehicle is less than the first threshold value, the state of the vehicle is in transition from the moving state to the stopped state, and the control amount of the actuator is greater than zero, the control unit decreases the control amount of the actuator such that the control amount of the actuator becomes zero before the speed of the vehicle becomes zero.

2. The stabilizer control device according to claim 1, wherein the control unit is further configured to:
determine whether or not the vehicle is decelerating,
wherein when the vehicle is decelerating, determine that the state of the vehicle is in transition from the moving state to the stopped state, and
decrease the control amount of the actuator such that the control amount of the actuator becomes zero when the vehicle is decelerating.

3. The stabilizer control device according to claim 2, wherein a decrease gradient of the control amount of the actuator becomes higher as a deceleration of the vehicle becomes higher.

4. The stabilizer control device according to claim 1, wherein the control unit is further configured to:
determine whether or not a pitch behavior of the vehicle is occurring,
wherein when the pitch behavior is occurring, the determine that the state of the vehicle is in transition from the moving state to the stopped state, and
decrease the control amount of the actuator such that the control amount of the actuator becomes zero when the pitch behavior is occurring.

5. The stabilizer control device according to claim 4, wherein the first threshold value is set such that the control amount of the actuator becomes zero when the pitch behavior is occurring.

6. The stabilizer control device according to claim 4, wherein a decrease gradient of the control amount of the actuator is set such that the control amount of the actuator becomes zero when the pitch behavior is occurring.

7. The stabilizer control device according to claim 1, further comprising:
a stroke sensor configured to detect a stroke amount which is an amount of a vertical displacement of a vehicle body of the vehicle,
wherein the control unit is further configured to:
determine whether or not the stroke amount detected by the stroke sensor is greater than a second threshold value,
wherein when the stroke amount is greater than the second threshold value, determine that the state of the vehicle is in transition from the moving state to the stopped state, and
decrease the control amount of the actuator such that the control amount of the actuator becomes zero when the stroke amount is greater than the second threshold value.

8. The stabilizer control device according to claim 1, further comprising:
a stroke sensor configured to detect a stroke amount which is an amount of a vertical displacement of a vehicle body of the vehicle,
wherein the control unit is further configured to:
determine whether or not a change rate of the stroke amount detected by the stroke sensor is greater than a third threshold value,
wherein when the change rate of the stroke amount is greater than the third threshold value, determine that the state of the vehicle is in transition from the moving state to the stopped state, and
decrease the control amount of the actuator such that the control amount of the actuator becomes zero when the change rate of the stroke amount is greater than the third threshold value.

9. The stabilizer control device according to claim 1, wherein the control unit decreases the control amount of the actuator such that the control amount of the actuator overshoots zero and then becomes zero before the speed of the vehicle becomes zero.

* * * * *